United States Patent
Ushizu et al.

(10) Patent No.: US 12,449,302 B2
(45) Date of Patent: Oct. 21, 2025

(54) ARITHMETIC DEVICE, OPTICAL DETECTION DEVICE, AND GAIN CALCULATION METHOD

(71) Applicant: HAMAMATSU PHOTONICS K.K., Hamamatsu (JP)

(72) Inventors: Toshiaki Ushizu, Hamamatsu (JP); Toshikazu Ito, Hamamatsu (JP); Osamu Kanda, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 102 days.

(21) Appl. No.: 18/290,364

(22) PCT Filed: Mar. 14, 2022

(86) PCT No.: PCT/JP2022/011275
§ 371 (c)(1),
(2) Date: Nov. 13, 2023

(87) PCT Pub. No.: WO2023/286353
PCT Pub. Date: Jan. 19, 2023

(65) Prior Publication Data
US 2025/0109987 A1   Apr. 3, 2025

(30) Foreign Application Priority Data
Jul. 14, 2021  (JP) .................. 2021-116367

(51) Int. Cl.
*G01J 1/44*   (2006.01)
*H01J 43/10*  (2006.01)

(52) U.S. Cl.
CPC ............ *G01J 1/44* (2013.01); *H01J 43/10* (2013.01)

(58) Field of Classification Search
CPC ...... G01J 1/44; G01J 1/42; H01J 43/10; H01J 43/04
(Continued)

(56) References Cited

U.S. PATENT DOCUMENTS 3,564,301 A * 2/1971 McGhee .................. G01J 1/44
                                                     327/540
5,548,111 A    8/1996 Nurmi et al.
(Continued)

FOREIGN PATENT DOCUMENTS

| CN | 107526096 A | 12/2017 |
|---|---|---|
| CN | 110968005 A | 4/2020 |

(Continued)

OTHER PUBLICATIONS

Dziewiecki, Michał. Measurement-based characterization of multipixel avalanche photodiodes for scintillating detectors. No. EuCARD-BOO-2012-003. 2012. (Year: 2012).*
(Continued)

*Primary Examiner* — Christopher P McAndrew
(74) *Attorney, Agent, or Firm* — Faegre Drinker Biddle & Reath LLP

(57) ABSTRACT

An arithmetic device that calculates a gain of a photomultiplier tube includes: an acquisition unit that acquires a digital signal based on a dark pulse output from the photomultiplier tube placed in a dark state; and a calculation unit
(Continued)

that calculates a total number of electrons in the dark pulse based on the digital signal and calculates the gain of the photomultiplier tube based on the total number of electrons.

7 Claims, 7 Drawing Sheets

(58) Field of Classification Search
USPC .......................................................... 324/409
See application file for complete search history.

(56) References Cited

U.S. PATENT DOCUMENTS

| | | | | |
|---|---|---|---|---|
| 7,157,681 | B1* | 1/2007 | Tetzlaff | ................... H01J 43/04 |
| | | | | 250/214 VT |
| 2013/0299673 | A1* | 11/2013 | Williams | ................... G01J 1/18 |
| | | | | 250/206 |
| 2014/0029715 | A1* | 1/2014 | Hansen | ................... H03K 5/135 |
| | | | | 250/200 |
| 2015/0153223 | A1* | 6/2015 | Onishi | ...................... G01J 1/44 |
| | | | | 250/214 A |

FOREIGN PATENT DOCUMENTS

| | | |
|---|---|---|
| JP | 2699474 B2 | 1/1998 |
| JP | 2000-275102 A | 10/2000 |
| JP | 5124498 B2 | 1/2013 |
| JP | 2014-092774 A | 5/2014 |
| WO | WO-2016158421 A1 * | 10/2016 ................ G01J 1/42 |
| WO | WO-2019/102637 A1 | 5/2019 |

OTHER PUBLICATIONS

Hays, K. M., and R. A. LaViolette. Study of solid state photomultiplier. No. NASA-CR-177465. 1987. (Year: 1987).*
Baicker, J. A. "Dark current in photomultipliers." IRE Transactions on Nuclear Science 7.2/3 (1960): 74-80. (Year: 1960).*
Barbarino, Giancarlo, Felicia Barbato, and Elisabetta Nocerino. "The Semiconductor Multiplication System for Photoelectrons in a Vacuum Silicon Photomultiplier Tube (VSiPMT) and Related Front End Electronics." Universita degli Studi di Napoli (2016). (Year: 2016).*
Ingle, J. D., and S. R. Crouch. "Critical comparison of photon counting and direct current measurement techniques for quantitative spectrometric methods." Analytical Chemistry 44.4 (1972): 785-794. (Year: 1972).*
Barbarino, G. "Silicon photo multipliers detectors operating in geiger regime: an unlimited device for future applications, photodiodes-world activities in 2011." J.-W. Park (Ed.) (2011). (Year: 2011).*
Macleod, Audrey. "Measuring the gain of a photomultiplier tube." (2007). (Year: 2007).*
Strindehag, Ove. Photomultiplier tubes for Low Level Cerenkov Detectors. No. AE--180. AB Atomenergi, Nykoeping (Sweden), 1965. (Year: 1965).*
International Preliminary Report on Patentability mailed Jan. 25, 2024 for PCT/JP2022/011275.

* cited by examiner

ARITHMETIC DEVICE, OPTICAL DETECTION DEVICE, AND GAIN CALCULATION METHOD

TECHNICAL FIELD

The present disclosure relates to an arithmetic device, an optical detection device, and a gain calculation method.

BACKGROUND ART

An optical detection device including a photomultiplier tube is known (for example, Patent Document 1). In such an optical detection device, the light amount (incident light amount) of the light entering the photomultiplier tube is calculated based on the output signal from the photomultiplier tube.

CITATION LIST

Patent Literature

Patent Document 1: Japanese Patent Application Laid-Open Publication No. 2014-92774

SUMMARY OF INVENTION

Technical Problem

The gain of the photomultiplier tube is used to determine the incident light amount from the output signal from the photomultiplier tube. Since this gain can vary depending on the environment around the photomultiplier tube and the conditions of use, it is desirable to measure the gain. A dedicated circuit for measuring the gain may be provided, but the circuit structure becomes complicated.

The present disclosure describes an arithmetic device, an optical detection device, and a gain calculation method capable of calculating a gain of a photomultiplier tube while suppressing the complication of a circuit structure.

Solution to Problem

An arithmetic device according to one aspect of the present disclosure is a device that calculates a gain of a photomultiplier tube. The arithmetic device includes: an acquisition unit that acquires a digital signal based on a dark pulse output from the photomultiplier tube placed in a dark state; and a calculation unit that calculates a total number of electrons in the dark pulse based on the digital signal and calculates the gain based on the total number of electrons.

In the arithmetic device, the digital signal based on the dark pulse output from the photomultiplier tube placed in a dark state is acquired, and the total number of electrons in the dark pulse is calculated based on the digital signal. When the photomultiplier tube is placed in a dark state, one thermionic electron is generated, and the dark pulse can be generated by multiplying the one thermionic electron. Therefore, since the total number of electrons in the dark pulse can be equivalent to the gain of the photomultiplier tube, the gain can be calculated based on the total number of electrons. As described above, since it is not necessary to provide a dedicated circuit for measuring the gain, the gain of the photomultiplier tube can be calculated while suppressing the complication of the circuit structure.

The digital signal may be generated by an AD converter quantizing, at a sampling frequency, a voltage signal obtained by an amplifier performing current-voltage conversion on the dark pulse using a conversion coefficient. The calculation unit may calculate the total number of electrons based on the digital signal, the conversion coefficient, and the sampling frequency. In this case, the conversion coefficient and the sampling frequency used for generating the digital signal are taken into consideration, so that the calculation accuracy of the total number of electrons can be improved. As a result, the calculation accuracy of gain can be improved.

The calculation unit may calculate an area of a waveform of the digital signal, may multiply the area by a reciprocal of the conversion coefficient and a physical amount per unit area obtained by dividing a quantization interval of the AD converter by the sampling frequency, and may calculate the total number of electrons by dividing a multiplication result by an electron charge. In this case, the Coulomb amount of the dark pulse is obtained by multiplying the area of the waveform of the digital signal by the physical amount per unit area and the reciprocal of the conversion coefficient. Then, the total number of electrons in the dark pulse is obtained by dividing the Coulomb amount of the dark pulse by the electron charge. Since the physical amount per unit area, the conversion coefficient, and the electron charge are all constant values, the gain can be easily calculated simply by calculating the area of the waveform of the digital signal.

The calculation unit may calculate the total number of electrons for each of a plurality of dark pulses, and may calculate the gain based on the total numbers of electrons in the plurality of dark pulses. The total number of electrons may vary from dark pulse to dark pulse. Therefore, by calculating the total numbers of electrons in the plurality of dark pulses and using the total numbers of electrons, it is possible to improve the calculation accuracy of the gain.

The calculation unit may calculate another gain at a supply voltage different from a supply voltage to the photomultiplier tube when the dark pulse is generated, based on the gain. In this case, the gain at one supply voltage is used to calculate the gain at another supply voltage. Therefore, it is possible to calculate gains at various supply voltages without acquiring dark pulses. As a result, calculation of the gains at various supply voltages can be simplified.

An optical detection device according to another aspect of the present disclosure includes the photomultiplier tube and the arithmetic device.

Since the optical detection device includes the above-mentioned arithmetic device, the gain of the photomultiplier tube can be calculated while suppressing the complication of the circuit structure.

A gain calculation method according to yet another aspect of the present disclosure is a method for calculating a gain of a photomultiplier tube. The gain calculation method includes: a step of acquiring a digital signal based on a dark pulse output from the photomultiplier tube placed in a dark state; and a step of calculating a total number of electrons in the dark pulse based on the digital signal and calculating the gain based on the total number of electrons.

In the gain calculation method, the digital signal based on the dark pulse output from the photomultiplier tube placed in a dark state is acquired, and the total number of electrons in the dark pulse is calculated based on the digital signal. When the photomultiplier tube is placed in a dark state, one thermionic electron is generated, and the dark pulse can be generated by multiplying the one thermionic electron. Therefore, since the total number of electrons in the dark pulse can be equivalent to the gain of the photomultiplier tube, the gain can be calculated based on the total number of electrons. As described above, since it is not necessary to provide a dedicated circuit for measuring the gain, the gain of the photomultiplier tube can be calculated while suppressing the complication of the circuit structure.

Advantageous Effects of Invention

According to the present disclosure, it is possible to calculate the gain of the photomultiplier tube while suppressing complication of the circuit structure.

DESCRIPTION OF EMBODIMENTS

Figure 1:
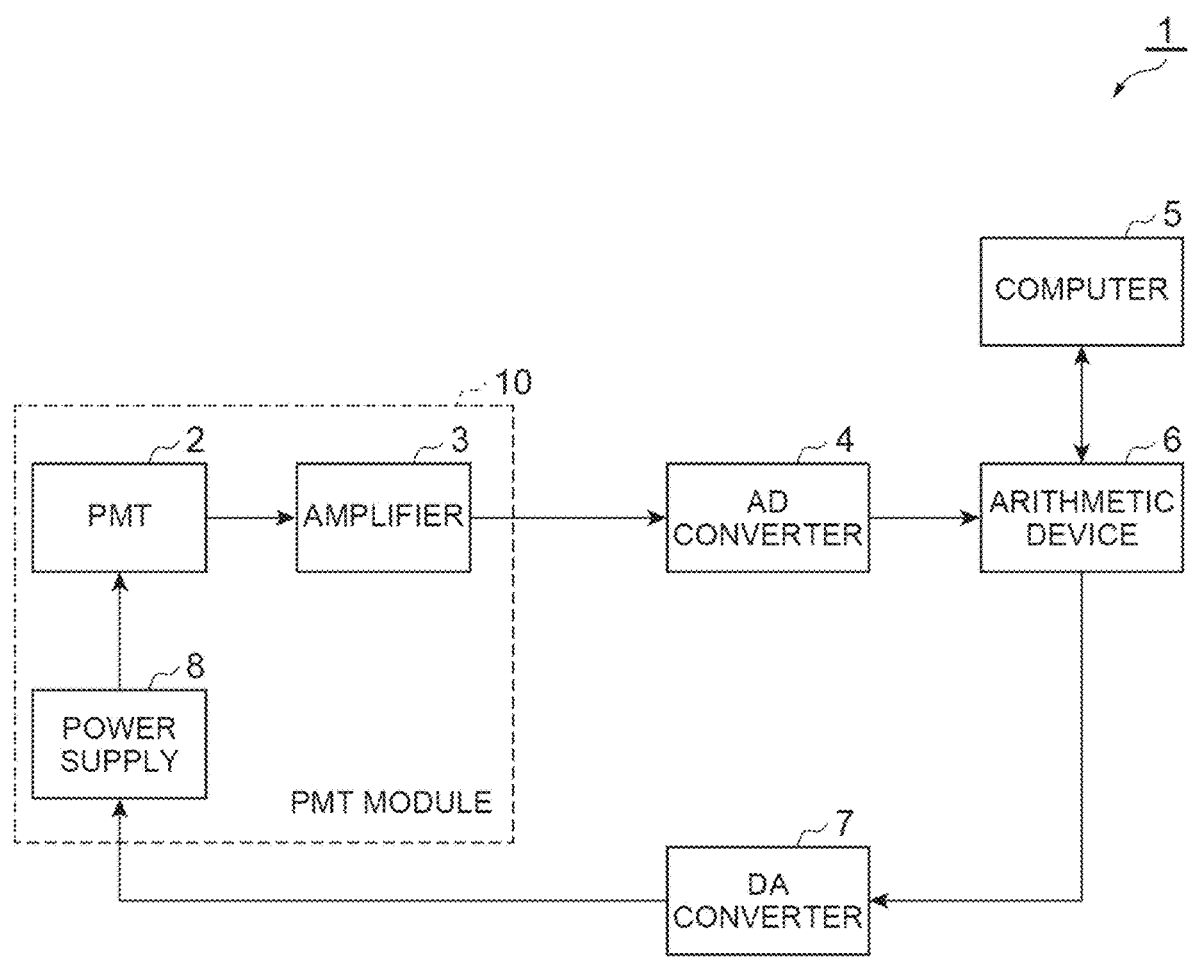
FIG. 1 is a configuration diagram schematically showing an optical detection device including an arithmetic device according to an embodiment.

Hereinafter, embodiments of the present disclosure will be described with reference to the drawings. In the description of the drawings, the same elements are denoted by the same reference numerals, and redundant description will be omitted.

A schematic configuration of an optical detection device including an arithmetic device according to an embodiment will be described with reference to FIG. 1. FIG. 1 is a configuration diagram schematically showing an optical detection device including an arithmetic device according to an embodiment. An optical detection device 1 shown in FIG. 1 is a device for detecting light. The optical detection device 1 includes a photo-multiplier tube (PMT) 2, an amplifier 3, an analog to digital converter (AD converter) 4, a computer 5, an arithmetic device 6, a digital to analog converter (DA converter) 7, and a power supply 8.

The photomultiplier tube 2 is a structure for converting light (incident light) incident on the photomultiplier tube 2 into an electric current signal. The photomultiplier tube 2 includes a photocathode 21, an electron multiplier 22, and an anode 23 (see FIG. 2). The photocathode 21 is a member (cathode) for converting incident light into photoelectrons. The photocathode 21 generates photoelectrons in accordance with the incident light amount and discharges the photoelectrons to the electron multiplier 22. The photocathode 21 generates a thermionic electron in a dark state and emits the thermionic electron to the electron multiplier 22. The dark state is a state in which incident light such as measurement light and background light is blocked.

The electron multiplier 22 is a portion that multiplies the photoelectrons and the thermionic electron emitted from the photocathode 21. The electron multiplier 22 includes a plurality of dynodes. In the present embodiment, the electron multiplier 22 includes n dynodes (dynodes Dy1 to Dyn). The dynodes Dy1 to Dyn are arranged in multiple stages from the photocathode 21 toward the anode 23 in that order.

The dynode Dy1 emits secondary electrons by collisions of the photoelectrons or the thermionic electron emitted from the photocathode 21. As a result, the photoelectrons or the thermionic electron are multiplied. The dynode Dy1 emits secondary electrons to the dynode Dy2 together with the photoelectrons or the thermionic electron. Thereafter, each of the dynodes Dy2 to Dyn−1 multiplies the electrons emitted from the preceding dynode and emits the multiplied electrons to the succeeding dynode. The final stage dynode Dyn emits the multiplied electrons to the anode 23. The anode 23 collects electrons multiplied by the electron multiplier 22 and outputs the collected electrons as an electric current signal to the outside of the photomultiplier tube 2. The electric current signal is an analog signal.

The amplifier 3 is a circuit for converting an electric current signal output from the photomultiplier tube 2 into a voltage signal. The voltage signal is an analog signal. The amplifier 3 converts the electric current signal into the voltage signal using a conversion coefficient $A_{cv}$. The amplifier 3 outputs the voltage signal to the AD converter 4.

The AD converter 4 is a circuit for converting a voltage signal output from the amplifier 3 into a digital signal. The AD converter 4 samples the voltage signal at a sampling frequency $f_s$ and quantizes the sampled voltage signal at a quantization interval $\Delta d$ to generate the digital signal. The AD converter 4 outputs the digital signal to the arithmetic device 6.

The computer 5 sets values of various parameters in the arithmetic device 6. Examples of the parameters include a parameter for setting an operation mode, the conversion coefficient $A_{cv}$, the sampling frequency $f_s$, the quantization interval $\Delta d$, and a voltage value of a voltage supplied to the photomultiplier tube 2. The parameter for setting the operation mode is set to a value indicating the operation mode of the optical detection device 1. The operation mode includes a light detection mode in which the optical detection device 1 performs normal light detection, and a gain calculation mode in which the optical detection device 1 measures (calculates) a gain of the photomultiplier tube 2.

The arithmetic device 6 is a device for performing arithmetic operations using the digital signal output from the AD converter 4. The arithmetic device 6 is configured as a circuit (circuitry) including, for example, a processor, a memory, and a communication module. Examples of the processor include a microcomputer and a central processing unit (CPU). Instead of the processor, a field programmable gate array (FPGA) may be used.

The arithmetic device 6 performs arithmetic operations according to the operation mode set by the computer 5. When the operation mode is set to the light detection mode, the arithmetic device 6 calculates the incident light amount based on the digital signal output from the AD converter 4. When the operation mode is set to the gain calculation mode, the arithmetic device 6 calculates the gain of the photomultiplier tube 2 based on the digital signal output from the AD converter 4. The arithmetic device 6 outputs a control voltage corresponding to the voltage value of the supply voltage set by the computer 5 to the power supply 8 via the DA converter 7. The control voltage is a voltage for causing the power supply 8 to supply a supply voltage having the voltage value. The functional configuration of the arithmetic device 6 will be described later.

The power supply 8 is a device for applying a supply voltage to the photomultiplier tube 2. The power supply 8 receives the control voltage via the DA converter 7 and applies a supply voltage corresponding to the control voltage to the photomultiplier tube 2. The power supply 8 is, for example, a high-voltage power supply.

The photomultiplier tube 2, the amplifier 3, and the power supply 8 constitute a PMT module 10.

Figure 2:
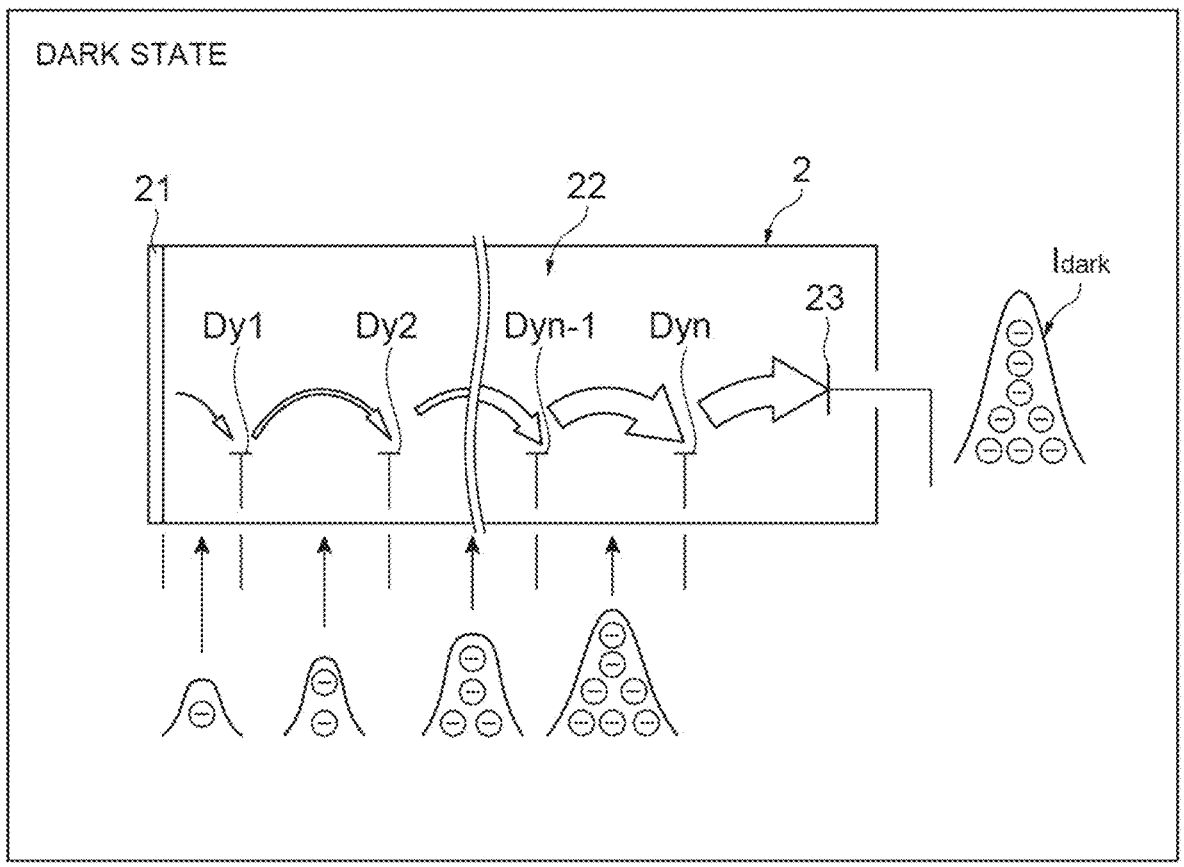
FIG. 2 is a diagram for describing a dark pulse generated from a photomultiplier tube placed in a dark state.
Figure 3:
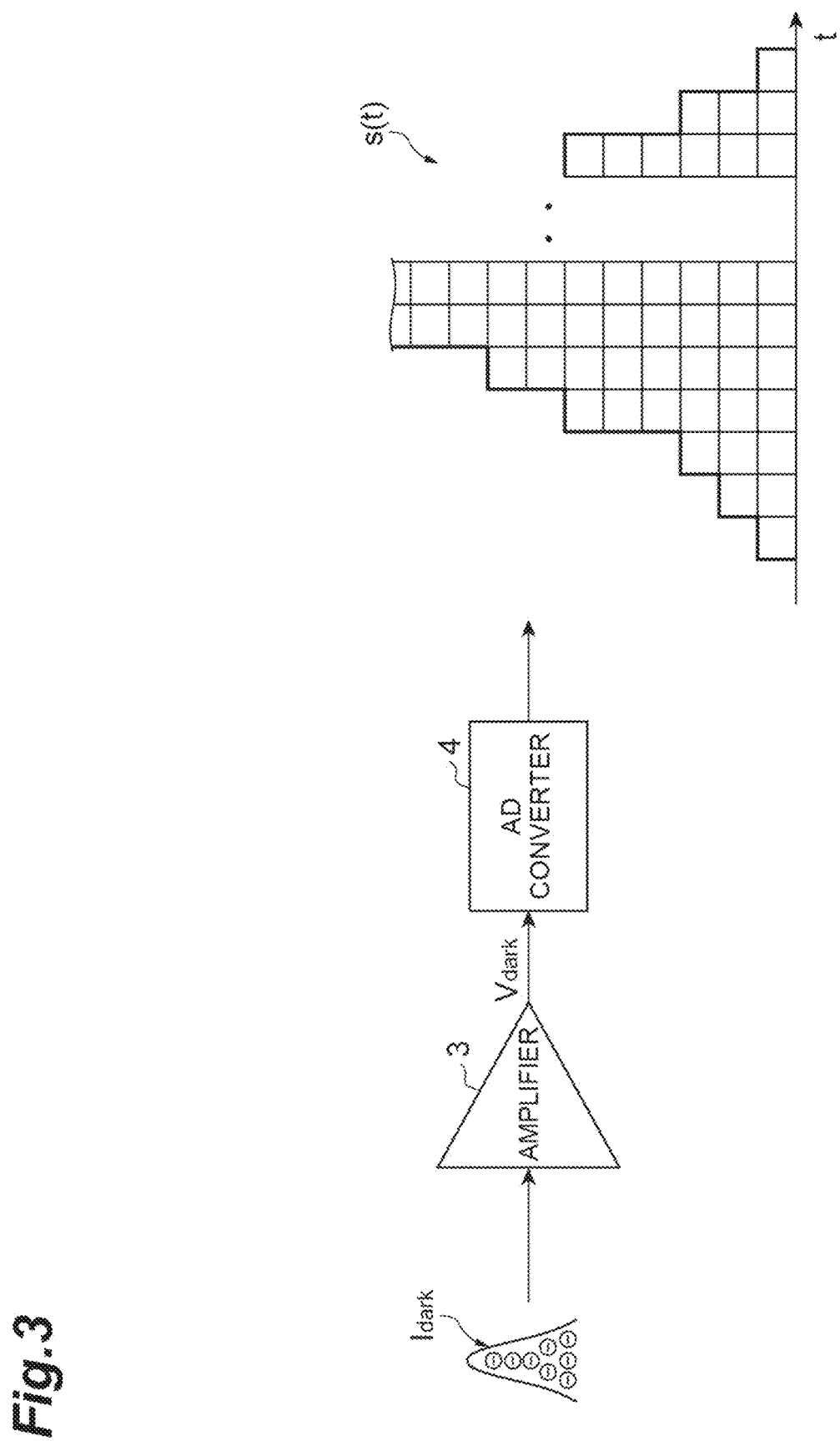
FIG. 3 is a diagram for describing a digital signal acquired by the arithmetic device shown in FIG. 1.

Next, the operation of the optical detection device 1 in the gain calculation mode will be described with reference to FIGS. 2 and 3. FIG. 2 is a diagram for describing a dark pulse generated from a photomultiplier tube placed in a dark state. FIG. 3 is a diagram for describing a digital signal acquired by the arithmetic device shown in FIG. 1. As shown in FIG. 2, when the optical detection device 1 operates in the gain calculation mode, the photomultiplier tube 2 is placed in a dark state in which any incident light is blocked. The photomultiplier tube 2 is disposed, for example, in a dark room. The PMT module 10 may have a light-shielding function (light-shielding structure) for the photomultiplier tube 2, or the entire PMT module 10 may be disposed in the dark. Even when the photomultiplier tube 2 is placed in a dark state, a thermionic electron (dark current) is generated from the photocathode 21. The thermionic electron is multiplied in the electron multiplier 22, and the multiplied thermionic electrons are output from the anode 23 as an anode current. Since the anode current has a pulse waveform, it is referred to as a dark pulse.

As shown in FIG. 3, a dark pulse $I_{dark}$ generated in the photomultiplier tube 2 is converted into a voltage signal $V_{dark}$ by the amplifier 3. Then, the voltage signal $V_{dark}$ is converted into a digital signal s(t) by the AD converter 4, and the digital signal s(t) is output to the arithmetic device 6. The arithmetic device 6 calculates the gain of the photomultiplier tube 2 based on the digital signal s(t). The gain calculation method will be described later.

Figure 4:
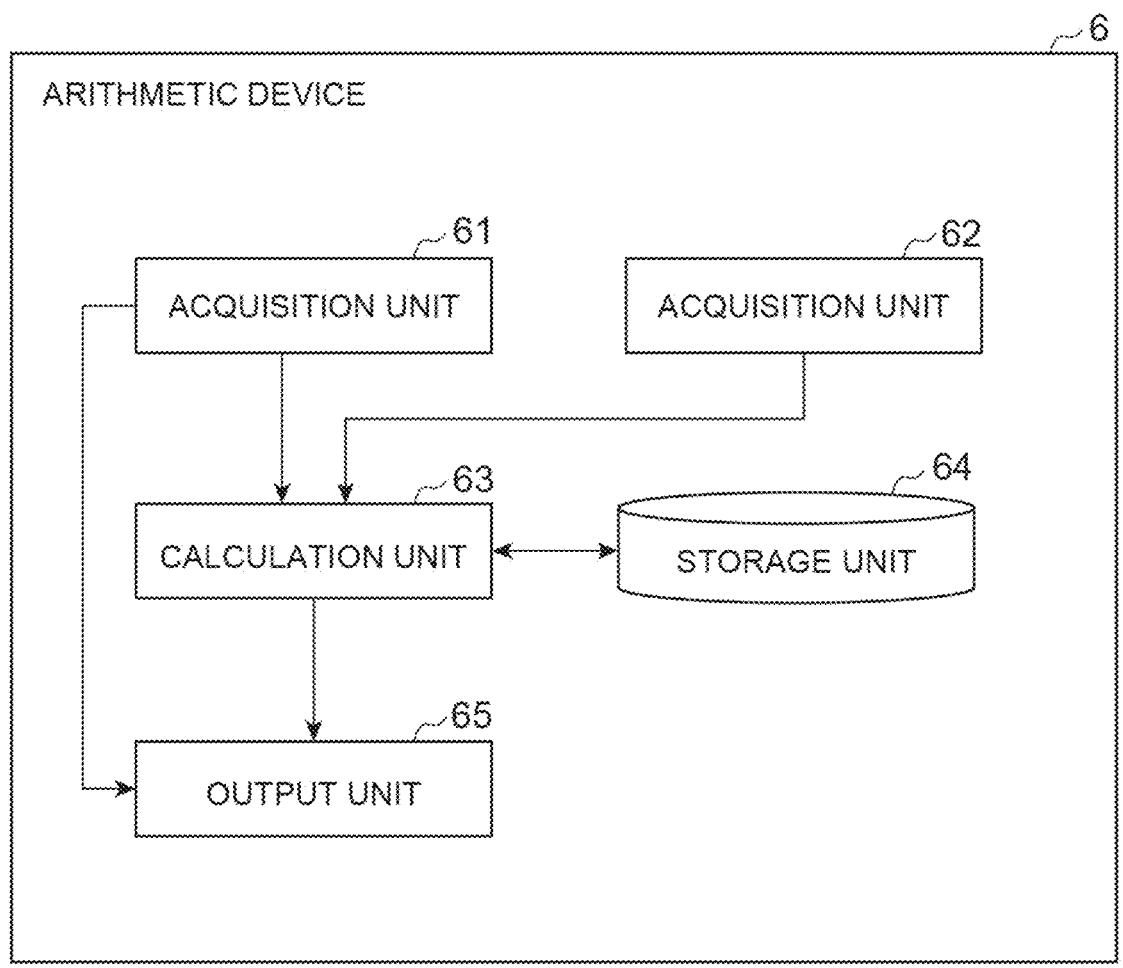
FIG. 4 is a block diagram showing a functional configuration of the arithmetic device shown in FIG. 1.

Next, the functional configuration of the arithmetic device 6 will be described with reference to FIG. 4. FIG. 4 is a block diagram showing a functional configuration of the arithmetic device shown in FIG. 1. As shown in FIG. 4, the arithmetic device 6 functionally includes an acquisition unit 61, an acquisition unit 62, a calculation unit 63, a storage unit 64, and an output unit 65. Since the function (operation) of each functional unit will be described in detail in the description of the gain calculation method described later, the function of each functional unit will be briefly described here.

The acquisition unit 61 is a functional unit for acquiring each parameter value from the computer 5. The acquisition unit 61 acquires, for example, parameters for setting an operation mode, a conversion coefficient $A_{cv}$, a sampling frequency $f_s$, a quantization interval $\Delta d$, and a voltage value of a voltage supplied to the photomultiplier tube 2.

The acquisition unit 62 is a functional unit for acquiring a digital signal from the AD converter 4. When the operation mode is set to the light detection mode, the acquisition unit 62 acquires a digital signal corresponding to the incident light. When the operation mode is set to the gain calculation mode, the acquisition unit 62 acquires a digital signal based on a dark pulse generated by multiplication of the thermionic electron in the photomultiplier tube 2.

The calculation unit 63 is a functional unit for performing various calculations. When the operation mode is set to the light detection mode, the calculation unit 63 calculates the incident light amount based on the digital signal. When the operation mode is set to the gain calculation mode, the calculation unit 63 calculates the total number of electrons in the dark pulse on the basis of the digital signal, and calculates the gain of the photomultiplier tube 2 on the basis of the total number of electrons. The calculation unit 63 may calculate the total number of electrons in one dark pulse as the estimated gain, and calculate the gain of the photomultiplier tube 2 based on the estimated gains of a plurality of dark pulses. The estimated gain is a gain calculated from one dark pulse (digital signal), and is also referred to as an electronic multiplication factor. On the other hand, the gain of the photomultiplier tube 2 obtained from the mean value calculated based on the estimated gains (electronic multiplication factors) of a plurality of dark pulses is also referred to as a current multiplication factor.

The storage unit 64 is a functional unit for storing the estimated gain. The storage unit 64 stores the estimated gain calculated by the calculation unit 63.

The output unit 65 is a functional unit for outputting the calculation result of the calculation unit 63. When the operation mode is set to the light detection mode, the output unit 65 outputs the incident light amount. When the operation mode is set to the gain calculation mode, the output unit 65 outputs the gain of the photomultiplier tube 2. The output unit 65 outputs the control voltage to the power supply 8 via the DA converter 7.

Figure 5:
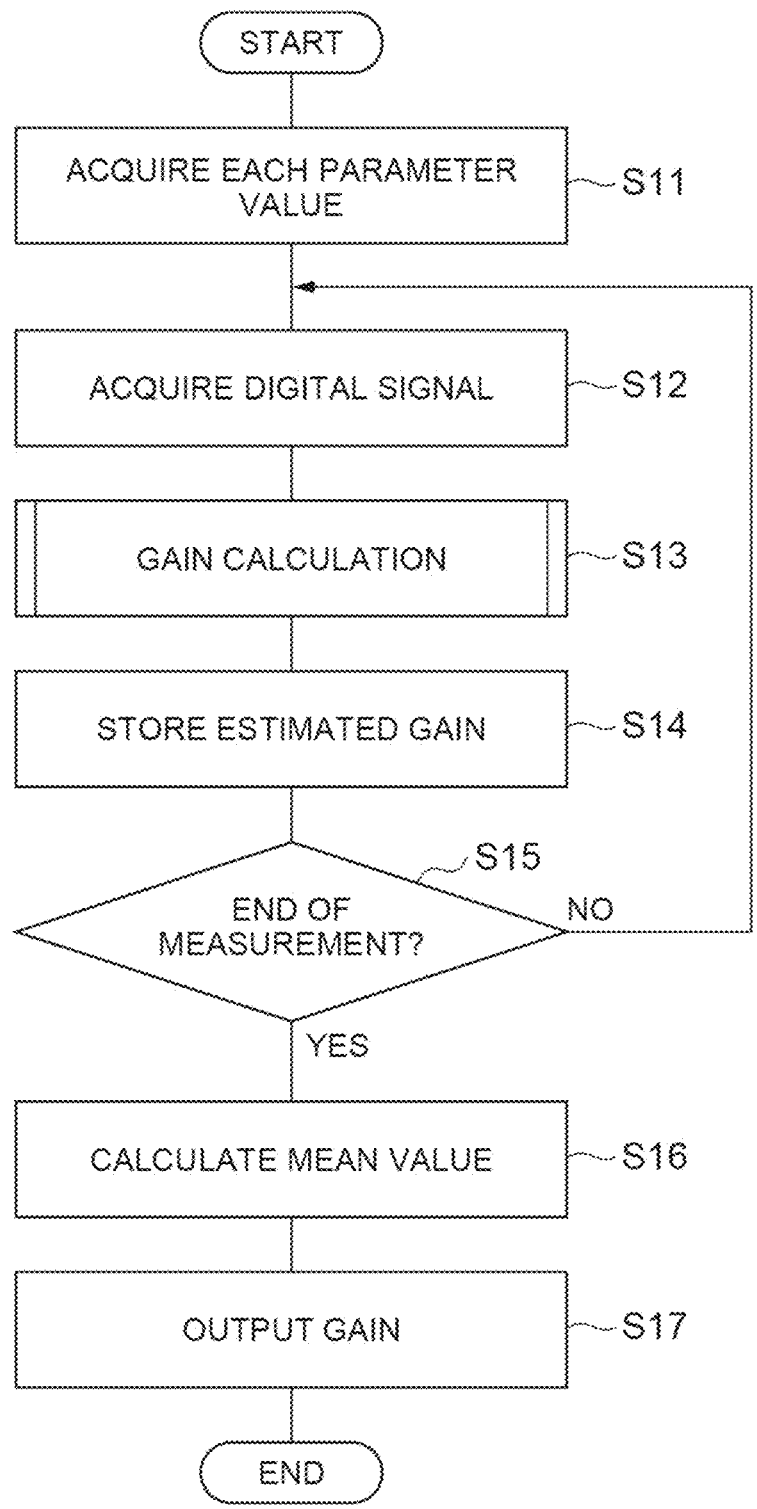
FIG. 5 is a flowchart showing a gain calculation method performed by the arithmetic device shown in FIG. 1.
Figure 6:
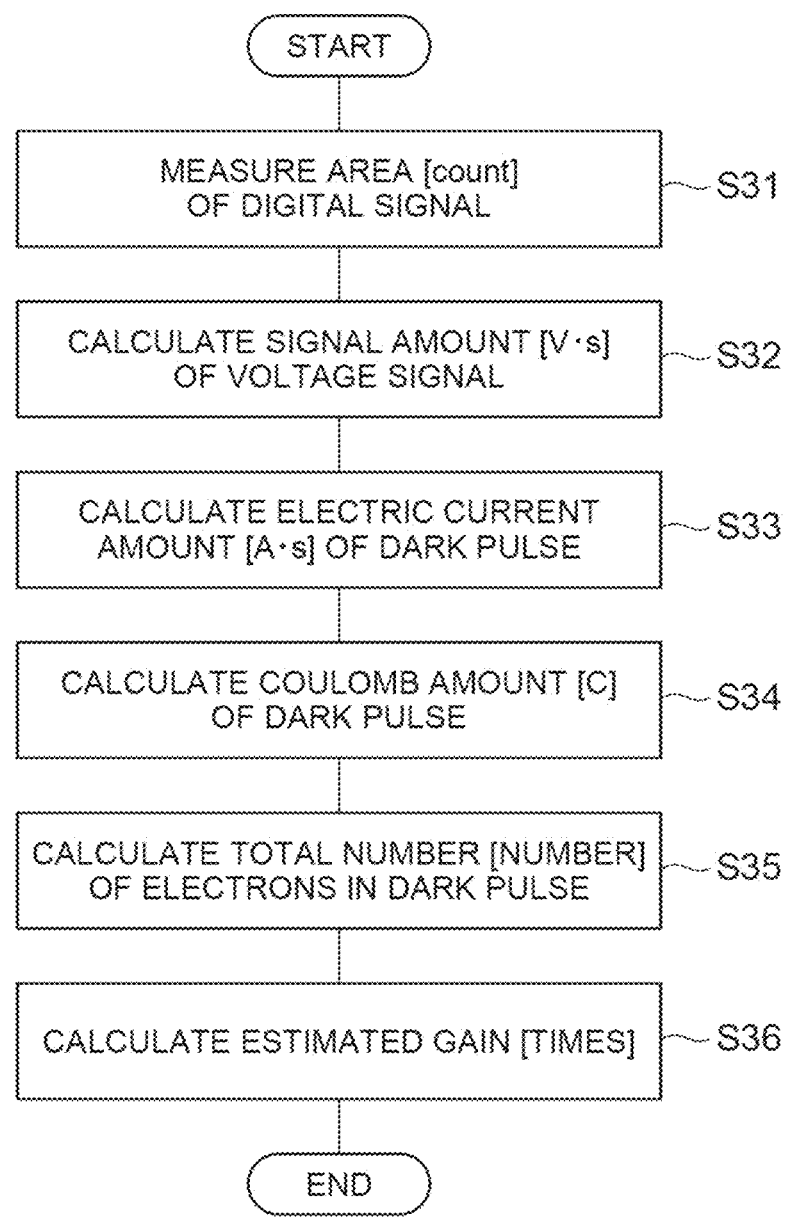
FIG. 6 is a flowchart showing the gain calculation process of FIG. 5 in detail.
Figure 7:
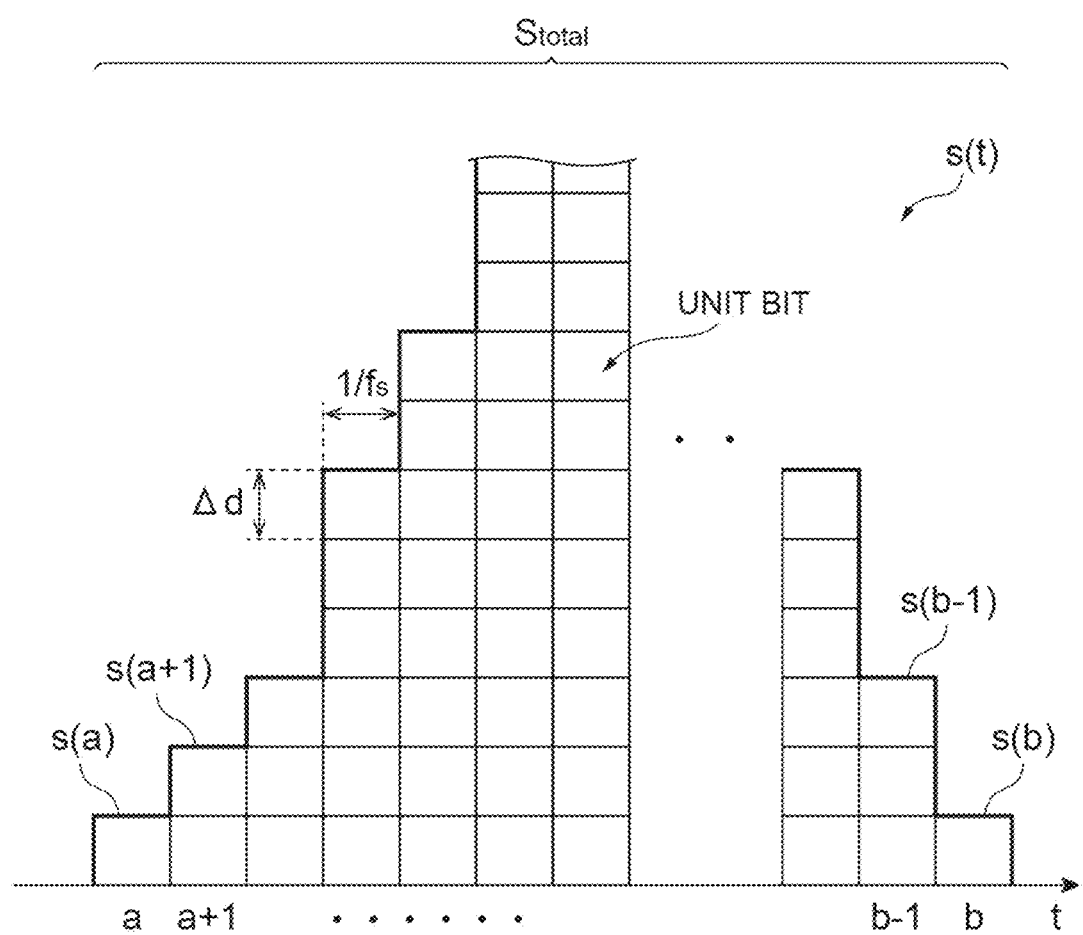
FIG. 7 is a diagram for describing an area of a waveform of the digital signal shown in FIG. 3.

Next, a gain calculation method performed by the arithmetic device 6 will be described with reference to FIGS. 5 to 7. FIG. 5 is a flowchart showing a gain calculation method performed by the arithmetic device shown in FIG. 1. FIG. 6 is a flowchart showing the gain calculation process of FIG. 5 in detail. FIG. 7 is a diagram for describing an area of a waveform of the digital signal shown in FIG. 3. The series of processes shown in FIG. 5 is started, for example, in response to the operation mode being set to the gain calculation mode. As described above, the photomultiplier tube 2 is placed in a dark state.

As shown in FIG. 5, first, the acquisition unit 61 acquires each parameter value (step S11). In step S11, the acquisition unit 61 acquires the conversion coefficient $A_{cv}$, the sampling frequency $f_s$, the quantization interval $\Delta d$, and the voltage value of the voltage supplied to the photomultiplier tube 2. Then, the acquisition unit 61 outputs the conversion coefficient $A_{cv}$, the sampling frequency $f_s$, and the quantization interval $\Delta d$ to the calculation unit 63, and causes the output unit 65 to output a control voltage corresponding to the voltage value.

As described above, a thermionic electron is generated from the photocathode 21. The thermionic electron is multiplied by the electron multiplier 22, and a dark pulse $I_{dark}$ is output from the anode 23. Then, the dark pulse $I_{dark}$ is converted into a voltage signal $V_{dark}$ by the amplifier 3. Then, in the AD converter 4, the voltage signal $V_{dark}$ is sampled at the sampling frequency $f_s$, and the sampled voltage signal $V_{dark}$ is quantized at the quantization interval $\Delta d$ to generate a digital signal s(t). Then, the digital signal s(t) is input to the arithmetic device 6. That is, the digital signal s(t) is input to the arithmetic device 6 as a discrete digital value. The time t is a discrete time and increases by one for each sampling time ($=1/f_s$).

Subsequently, the acquisition unit 62 acquires the digital signal s(t) based on the dark pulse $I_{dark}$ (step S12). Then, the acquisition unit 62 outputs the digital signal s(t) to the calculation unit 63.

Subsequently, a gain calculation process is performed (step S13). In step S13, as shown in FIG. 6, first, the calculation unit 63 measures the area $S_{total}$ [unit: count] of the waveform of the digital signal s(t) (step S31). As shown in FIG. 7, in the present embodiment, the digital signal s(t) has a pulse-like waveform from the start time a to the end time b. As shown in Equation (1), the area $S_{total}$ is obtained by adding up the digital values from the start time a to the end time b. The calculation unit 63 calculates (measures) the area $S_{total}$ using Equation (1).

[Equation 1]

$$S_{total} = \int_a^b s(t)dt \quad [\text{count}] \quad (1)$$

Subsequently, the calculation unit 63 calculates a signal amount [unit: V·s] of the voltage signal $V_{dark}$ (step S32). As shown in Equation (2), the physical amount $\Delta s$ [unit: V·s/count] per unit bit (unit area) of the digital value is obtained by dividing the quantization interval $\Delta d$ [unit: V/count] by the sampling frequency $f_s$ [unit: Hz].

[Equation 2]

$$\Delta s = \frac{\Delta d}{f_s} \quad [\text{V·s/count}] \quad (2)$$

As shown in Equation (3), the signal amount of the voltage signal $V_{dark}$ is obtained by multiplying the area $S_{total}$ by the physical amount $\Delta s$. The calculation unit 63 calculates the signal amount of the voltage signal $V_{dark}$ using Equation (3). For convenience of description, the signal amount of the voltage signal $V_{dark}$ may be expressed as "$V_{dark}$" in the equation.

[Equation 3]

$$V_{dark} = S_{total} \times \Delta s = S_{total} \times \frac{\Delta d}{f_s} \quad [\text{V·s}] \quad (3)$$

Subsequently, the calculation unit 63 calculates the electric current amount [unit: A·s] of the dark pulse $I_{dark}$ (step S33). Since the amplifier 3 converts the electric current signal into a voltage signal, the electric current amount of the dark pulse $I_{dark}$ can be obtained from the signal amount of the voltage signal $V_{dark}$ by using this inverse conversion. Specifically, as shown in Equation (4), the electric current amount of the dark pulse $I_{dark}$ is obtained by multiplying the signal amount of the voltage signal $V_{dark}$ by the reciprocal of the conversion coefficient $A_{cv}$ [unit: V/A]. The calculation unit 63 calculates the electric current amount of the dark pulse $I_{dark}$ by using Equation (4). For convenience of description, the electric current amount of the dark pulse $I_{dark}$ may be expressed as "$I_{dark}$" in the equation.

[Equation 4]

$$I_{dark} = \frac{V_{dark}}{A_{cv}} = S_{total} \times \frac{\Delta d}{f_s \times A_{cv}} \quad [A \cdot s] \quad (4)$$

Subsequently, the calculation unit 63 calculates the Coulomb amount [unit: C] of the dark pulse $I_{dark}$ (step S34). In general, 1 coulomb [C] is defined as the amount of electricity carried when a electric current of 1 ampere [A] flows for 1 second [s]. Therefore, 1 [A·s] can be replaced by 1 [C]. Therefore, as shown in Equation (5), the Coulomb amount of the dark pulse $I_{dark}$ is equal to the electric current amount of the dark pulse $I_{dark}$. The calculation unit 63 calculates the Coulomb amount of the dark pulse $I_{dark}$ by using Equation (5).

[Equation 5]

$$I_{dark} = S_{total} \times \frac{\Delta d}{f_s \times A_{cv}} \quad [C] \quad (5)$$

Subsequently, the calculation unit 63 calculates the total number of electrons $D_{electron}$ [unit: number] in the dark pulse $I_{dark}$ (step S35). Generally, the amount of electric charge per electron [C] is referred to as the electron charge e. Therefore, as shown in Equation (6), the total number of electrons $D_{electron}$ is obtained by dividing the Coulomb amount of the dark pulse $I_{dark}$ by the electron charge e. The calculation unit 63 calculates the total number of electrons $D_{electron}$ by using Equation (6). That is, the calculation unit 63 calculates the area $S_{total}$ of the waveform of the digital signal s(t), multiplies the area $S_{total}$ by the physical amount $\Delta s$ per unit bit (unit area), which is obtained by dividing the quantization interval $\Delta d$ by the sampling frequency $f_s$, and the reciprocal of the conversion coefficient $A_{cv}$, and then calculates the total number of electrons $D_{electron}$ by dividing the multiplication result by the electron charge e.

[Equation 6]

$$D_{electron} = S_{total} \times \frac{\Delta d}{e \times f_s \times A_{cv}} \quad [\text{NUMBER}] \quad (6)$$

Subsequently, the calculation unit 63 calculates the estimated gain μ [unit: time] (step S36). As shown in Equation (7), the total number of electrons $D_{electron}$ is obtained by multiplying the number $K_{electron}$ [unit: number] of electrons incident on the first dynode Dy1 from the photocathode 21 (cathode) by the estimated gain μ.

[Equation 7]

$$D_{electron} = K_{electron} \times \mu \quad [\text{NUMBER}] \quad (7)$$

Here, the dark pulse is generated mainly due to a thermionic electron from the photocathode 21. Dark pulses are generated discretely and, in most cases, each dark pulse is generated due to a single thermionic electron. Thus, Equation (7) can be simplified as Equation (8).

[Equation 8]

$$D_{electron} = \mu \quad [\text{NUMBER}] \quad (8)$$

Equation (8) shows that the total number of electrons $D_{electron}$ and the estimated gain μ have the same value in an environment (dark state) in which a thermionic electron can be measured. Thus, by interchanging the right and left sides of Equation (8), Equation (9) is obtained. The calculation unit 63 calculates the estimated gain u by using Equation (9).

[Equation 9]

$$\mu = D_{electron} = S_{total} \times \frac{\Delta d}{e \times f_s \times A_{cv}} \quad [\text{TIME}] \quad (9)$$

Thus, the gain calculation process ends. Then, the calculation unit 63 stores the estimated gain μ in the storage unit 64 (step S14).

Subsequently, the calculation unit 63 determines whether or not to end the measurement (step S15). In step S15, the calculation unit 63 determines that the measurement is not ended when not all of the estimated gains μ for the predetermined number of calculations have been calculated. When the estimated gains μ for the number of calculations have been calculated, the calculation unit 63 determines that the measurement is ended. The number of calculations is set to about 1000, for example. When it is determined in step S15 that the measurement is not ended (step S15; NO), steps S12 to S15 are performed again.

On the other hand, when it is determined in step S15 that the measurement is ended (step S15; YES), the calculation unit 63 reads out the estimated gains μ for the number of calculations from the storage unit 64 and calculates the mean value of the estimated gains μ for the number of calculations (step S16). Then, the calculation unit 63 outputs the mean value as the gain of the photomultiplier tube 2 to the output unit 65.

Subsequently, when the output unit 65 receives the gain from the calculation unit 63, the output unit 65 outputs the gain to the outside of the arithmetic device 6 (step S17). The output unit 65 outputs the gain together with the voltage value of the supply voltage to the computer 5, for example. Then, the computer 5 stores the voltage value of the supply voltage and the gain in association with each other.

Thus, the series of processes of the gain calculation method ends. Since the estimated gain μ is obtained by Equation (9), if the area $S_{total}$ is measured, the estimated gain μ can be calculated. Therefore, steps S32 to S35 may be omitted. At least a part of step S11 may be performed before the operation mode is set to the gain calculation mode.

For example, as a measurement condition, it is assumed that the sampling frequency $f_s$ is set to 100 MSPS (Megasample(s) per second), the quantization interval Δd is set to 0.1 mV/count, and the conversion coefficient $A_{cv}$ is set to 0.1 V/μA. It is assumed that the area $S_{total}$ of the waveform of the digital signal s(t) observed under this measurement condition is $1\times10^5$ count. From Equation (3), the signal amount of the voltage signal $V_{dark}$ is calculated as $1\times10^{-7}$ V·s ($=1\times10^5\times\{1/(100\times10^6)\}\times(0.1\times10^{-3})$).

Further, from Equation (4), the electric current amount of the dark pulse $I_{dark}$ is calculated as $1\times10^{-12}$ A·s ($=1\times10^{-7}\times10\times10^{-6}$). As described above, since 1 [C] is equal to 1 [A·s], the Coulomb amount of the dark pulse $I_{dark}$ is $1\times10^{-12}$ C. Since the electron charge e is $1.602\times10^{-19}$ C, the number of electrons $D_{electron}$ is calculated as $6.24\times10^6$ ($\approx(1\times10^{-12})/(1.602\times10^{-19})$) from Equation (6). Since $6.24\times10^6$ electrons were generated from one thermionic electron, the estimated gain μ is estimated to be $6.24\times10^6$.

The above calculation is performed on the digital signals s(t) having 1000 or more waveforms, and the mean value of the estimated gains μ obtained by these calculations is used as the gain of the photomultiplier tube 2.

Next, the operation of the arithmetic device 6 when the operation mode is set to the light detection mode will be briefly described. First, the acquisition unit 61 acquires, from the computer 5, the conversion coefficient $A_{cv}$, the sampling frequency $f_s$, the quantization interval Δd, the voltage value of the voltage supplied to the photomultiplier tube 2, and the gain associated with the voltage value, as parameter values. Then, the acquisition unit 61 outputs the conversion coefficient $A_{cv}$, the sampling frequency $f_s$, the quantization interval Δd, and the gain to the calculation unit 63, and causes the output unit 65 to output a control voltage corresponding to the voltage value.

Then, the acquisition unit 62 acquires the digital signal s(t) based on the incident light, and outputs the digital signal s(t) to the calculation unit 63. Then, the calculation unit 63 calculates an incident light amount from the digital signal s(t) using the conversion coefficient $A_{cv}$, the sampling frequency $f_s$, the quantization interval Δd, and the gain, and outputs the incident light amount to the output unit 65. Then, the output unit 65 outputs the incident light amount to the outside of the arithmetic device 6. Thus, the series of processes in the light detection mode ends.

In the optical detection device 1, the arithmetic device 6, and the gain calculation method described above, the digital signal s(t) based on the dark pulse $I_{dark}$ output from the photomultiplier tube 2 placed in a dark state is acquired, and the total number of electrons $D_{electron}$ in the dark pulse $I_{dark}$ is calculated based on the digital signal s(t). When the photomultiplier tube 2 is placed in a dark state, one thermionic electron is generated, and the dark pulse $I_{dark}$ can be generated by multiplying the one thermionic electron. Therefore, since the total number of electrons $D_{electron}$ in the dark pulse $I_{dark}$ can be equivalent to the estimated gain u, the gain of the photomultiplier tube 2 can be calculated based on the total number of electrons $D_{electron}$.

As described above, most of the parameter values used to calculate the incident light amount from the digital signal s(t) are constant values, but the gain may vary depending on the surrounding environment and usage conditions of the photomultiplier tube 2. Although it is conceivable to provide a measurement circuit for measuring gain, the circuit structure may become complicated. Although it is conceivable to adopt a structure for stabilizing the gain, there is a possibility that the size of the photomultiplier tube 2 may be increased. Although a reference light source may be mounted, it is necessary to stabilize the reference light source at a high level, so that there is a possibility that the size of the optical detection device 1 may be increased. Since the optical detection device 1, the arithmetic device 6, and the gain calculation method do not require a dedicated circuit for measuring the gain, a structure for stabilizing the gain, and a reference light source, the gain of the photomultiplier tube 2 can be calculated while suppressing the complication of the circuit structure.

The digital signal s(t) acquired by the arithmetic device 6 is generated by the AD converter 4 quantizing the voltage signal $V_{dark}$, which is obtained by the amplifier 3 performing current-voltage conversion on the dark pulse $I_{dark}$ by using the conversion coefficient $A_{cv}$, at the sampling frequency $f_s$. The calculation unit 63 calculates the total number of electrons $D_{electron}$ based on the digital signal s(t), the conversion coefficient $A_{cv}$, and the sampling frequency $f_s$. According to this configuration, the conversion coefficient $A_{cv}$ and the sampling frequency $f_s$ used for generating the digital signal s(t) are taken into consideration, so that the calculation accuracy of the total number of electrons $D_{electron}$ can be improved. As a result, the calculation accuracy of gain can be improved.

Specifically, the Coulomb amount of the dark pulse $I_{dark}$ is obtained by multiplying the area $S_{total}$ of the waveform of the digital signal s(t) by the physical amount Δs and the reciprocal of the conversion coefficient $A_{cv}$. Then, the total number of electrons $D_{electron}$ in the dark pulse $I_{dark}$ is obtained by dividing the Coulomb amount of the dark pulse $I_{dark}$ by the electron charge e. Since the physical amount Δs, the conversion coefficient $A_{cv}$, and the electron charge e are constant values, the gain can be easily calculated simply by calculating the area $S_{total}$.

The total number of electrons $D_{electron}$ may vary for each dark pulse $I_{dark}$. On the other hand, the calculation unit 63 calculates the total number of electrons $D_{electron}$ for each dark pulse $I_{dark}$ for the predetermined number of calculations, and calculates the gain based on the total numbers of electrons $D_{electron}$. Specifically, the calculation unit 63 calculates the mean value of the estimated gains μ obtained from dark pulses $I_{dark}$ as the gain of the photomultiplier tube 2. In other words, the calculation unit 63 calculates the mean value of the total numbers of electrons $D_{electron}$ in the dark pulses $I_{dark}$ for the number of calculations as the gain of the photomultiplier tube 2. As described above, by using the total numbers of electrons $D_{electron}$ in the plurality of dark pulses $I_{dark}$, it is possible to improve the calculation accuracy of the gain.

The optical detection device according to the present disclosure is not limited to the above-described embodiments.

Each parameter value may be set from an external computer. In this case, the optical detection device 1 does not have to include the computer 5. A supply voltage may be supplied from an external power supply to the photomultiplier tube 2. In this case, the optical detection device 1 does not have to include the DA converter 7 and the power supply 8.

In the above-described embodiments, the calculation unit 63 uses the mean value of the estimated gains obtained from a plurality of dark pulses as the gain of the photomultiplier tube 2, but the method of calculating the gain of the photomultiplier tube 2 is not limited to this. For example, the calculation unit 63 may use the estimated gain obtained from one dark pulse as the gain of the photomultiplier tube 2. The calculation unit 63 may calculate the median value of the estimated gains obtained from a plurality of dark pulses as the gain of the photomultiplier tube 2.

The calculation unit 63 may calculate the gain at another supply voltage based on the gain calculated for one supply voltage. Another supply voltage is a supply voltage different from the supply voltage to the photomultiplier tube 2 when a dark pulse is generated in the gain calculation mode. As shown in Equation (10), the gain of the photomultiplier tube 2 can be expressed using a constant A, a voltage value V of the supply voltage, and a value kn. The value kn is determined by the structure of the photomultiplier tube 2.

[Equation 10]

$$\text{GAIN} = A \times V^{kn} \quad (10)$$

For example, the relationship between the supply voltage and the gain becomes a straight line having a slope equal to the value kn when drawn in a log-log graph. Therefore, from Equation (10), the gain at one supply voltage can be used to calculate the gain at another supply voltage. Therefore, it is possible to calculate gains at various supply voltages without acquiring dark pulses. As a result, calculation of the gains at various supply voltages can be simplified.

The arithmetic device 6 may calculate the gain for each of the plurality of supply voltages by the above-described gain calculation method.

The optical detection device 1 may further include a light source (for example, a single-photon light source) capable of outputting a predetermined amount of weak light. In this case, by irradiating the photocathode 21 with weak light from the light source, the arithmetic device 6 may acquire a digital signal of the weak light from the light source together with a digital signal based on the dark pulse, and may calculate the gain based on these digital signals. It should be noted that the optical detection device 1 does not have to include the light source described above, and a light source outside the optical detection device 1 may be used for the gain calculation.

REFERENCE SIGNS LIST

1: optical detection device, 2: photomultiplier tube, 3: amplifier, 4: AD converter, 5: computer, 6: arithmetic device, 7: DA converter, 8: power supply, 21: photocathode, 22: electron multiplier, 23: anode, 61: acquisition unit, 62: acquisition unit, 63: calculation unit, 64: storage unit, 65: output unit.

The invention claimed is:

1. An arithmetic device that calculates a gain of a photomultiplier tube, the arithmetic device comprising:
   an acquisition unit configured to acquire a digital signal based on a dark pulse output from the photomultiplier tube placed in a dark state; and
   a calculation unit configured to calculate a total number of electrons in the dark pulse based on the digital signal and calculate the gain based on the total number of electrons.

2. The arithmetic device according to claim 1,
   wherein the digital signal is generated by an AD converter quantizing, at a sampling frequency, a voltage signal obtained by an amplifier performing current-voltage conversion on the dark pulse using a conversion coefficient, and
   wherein the calculation unit calculates the total number of electrons based on the digital signal, the conversion coefficient, and the sampling frequency.

3. The arithmetic device according to claim 2,
   wherein the calculation unit calculates an area of a waveform of the digital signal, multiplies the area by a reciprocal of the conversion coefficient and a physical amount per unit area obtained by dividing a quantization interval of the AD converter by the sampling frequency, and calculates the total number of electrons by dividing a multiplication result by an electron charge.

4. The arithmetic device according to claim 1,
   wherein the calculation unit calculates the total number of electrons for each of a plurality of dark pulses, and calculates the gain based on the total numbers of electrons in the plurality of dark pulses.

5. The arithmetic device according to claim 1,
   wherein the calculation unit calculates another gain at a supply voltage different from a supply voltage to the photomultiplier tube when the dark pulse is generated, based on the gain.

6. An optical detection device comprising:
   the photomultiplier tube; and
   the arithmetic device according to claim 1.

7. A gain calculation method for calculating a gain of a photomultiplier tube, the gain calculation method comprising:
   a step of acquiring a digital signal based on a dark pulse output from the photomultiplier tube placed in a dark state; and a step of calculating a total number of electrons in the dark pulse based on the digital signal and calculating the gain based on the total number of electrons.

\* \* \* \* \*